A. ANDERSON.
HAND TRUCK.
APPLICATION FILED JAN. 21, 1907.
902,794.
Patented Nov. 3, 1908.
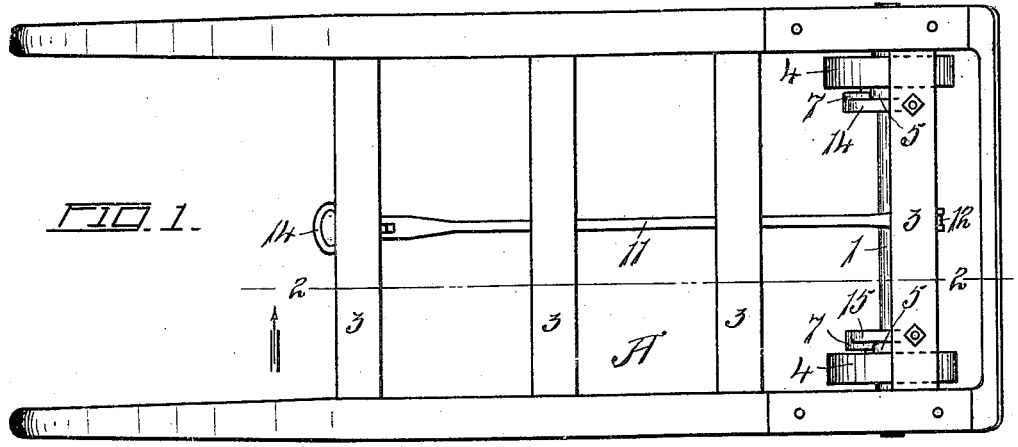
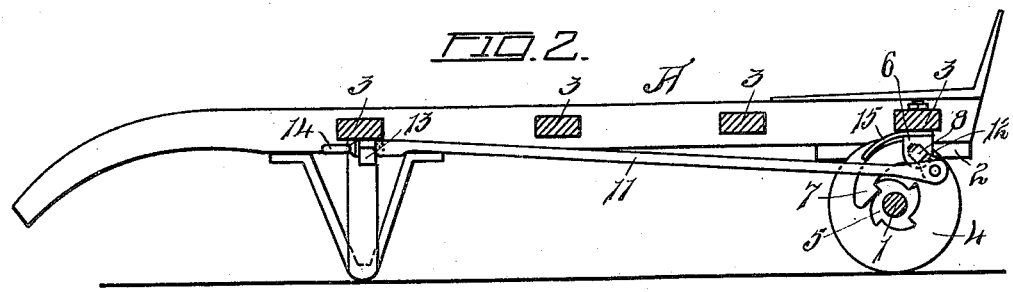
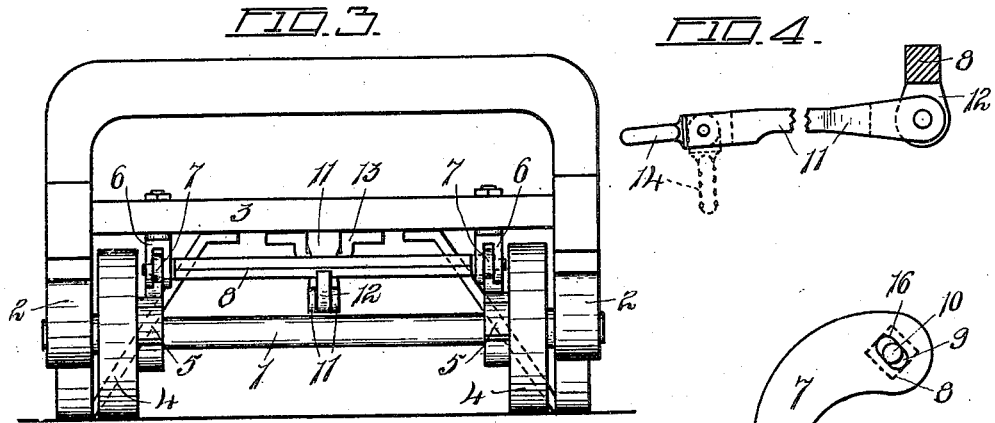
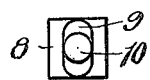
Inventor:
Andrew Anderson.
Witnesses:
Catharine Z. Crenshaw
By
F. J. Karson & Co.
Attorneys

UNITED STATES PATENT OFFICE.

ANDREW ANDERSON, OF OMAHA, NEBRASKA.

HAND-TRUCK.

No. 902,794.  Specification of Letters Patent.  Patented Nov. 3, 1908.

Application filed January 21, 1907. Serial No. 353,407.

*To all whom it may concern:*

Be it known that I, ANDREW ANDERSON, citizen of the United States, residing at Omaha, in the county of Douglas and State of Nebraska, have invented certain new and useful Improvements in Hand-Trucks, of which the following is a specification.

My invention relates to certain new and useful improvements in brakes for hand trucks; and has for its object to provide an inexpensive, durable and effective means for locking the wheels thereof against rotation while the truck is being loaded, thereby preventing the truck from accidentally slipping from under the load.

With these and other objects in view the invention consists in the construction and novel combination and arrangements of parts herein fully described, illustrated in the accompanying drawings and pointed out in the claims herein appended, it being understood that various changes in form, proportion and minor details may be resorted to without departing from the principle or sacrificing any of the advantages of the invention.

Referring to the accompanying drawings wherein like characters of reference denote similar parts throughout the several views:—

Figure 1, is a plan view of a truck equipped with my improvements. Fig. 2, is a longitudinally sectional view of Fig. 1, on line 2—2 looking in the direction of the arrow. Fig. 3, is a front view of the truck. Fig. 4, is a detail of the operating rod for locking and unlocking the wheels. Fig. 5, is an elevation of the transverse cross-bar. Fig. 6, is an end view thereof. Fig. 7, is an elevation of one of the dogs or pawls.

A, designates an ordinary truck provided at its forward end with the usual transverse axle 1, which is journaled within the bearings 2, as clearly shown in Fig. 3. The truck is also provided with the transverse members 3, as clearly shown in Figs. 1 and 2.

Mounted upon the axle 1, in the usual manner are the wheels 4, which are provided upon one side with a ratchet 5, which is preferably integral therewith.

Suitably secured to the forward transverse member 3, are the depending forked members or ears 6, between which are pivoted the pawls 7, which are mounted upon the transverse bar 8, which has its ends reduced as at 9, to form an oval and its extreme ends reduced to form pintles 10, as clearly shown in Figs. 5 and 6.

The oval portions 9, of the transverse bar 8, are adapted to work in openings 16, corresponding in shape and size to that of the oval portions 9, so that when the bar 8, is oscillated it engages and disengages the pawls 7, from ratchets 5. The oscillating movement is imparted to the transverse bar 8, by means of the operating rod 11, which runs longitudinally of the truck and underneath the transverse member 3. This rod 11, is pivotally secured to ear 12, which is secured preferably midway of the length of the transverse bar 8, and its opposite end is guided by means of the guide 13, which is secured to the under side of the rear transverse member 3.

The rear of the operating rod 11, it will be observed is provided with the pivotally held hand-grip 14, which acts as a locking means for keeping the pawls from engagement with the ratchet when it is not desired to lock the wheels. To lock the pawls from engagement with the ratchets it is necessary to place the hand-grip 14, in a depending or hanging position as shown in dotted lines in Fig. 4, thereby preventing the operating rod from a forward sliding movement.

It will be observed that I employ a pair of flat springs 15, which are securely held at one end between the ears 6, and the lower face of the transverse member 3. The remaining portions of these springs engage the pawls to prevent them from having any play when in a locked position.

The operation of the locking and unlocking mechanism is manifest from the preceding description. Hand-grip 14, being raised to a horizontal position and the operating rod pushed to its extreme forward position as shown in Fig. 2, the wheels are locked and to disengage the pawls from the ratchets thus unlocking the wheels the operating rod is pulled to the rear as far as it will go and the hand-grip swung to a hanging position as clearly shown in Fig. 4, which locks the pawls from engagement with the ratchets.

Having fully described my invention, what I claim as new and desire to secure by Letters Patent is:—

1. In a hand-truck in combination with the body having spaced transverse members and the axle, the wheels rigidly secured to said axle having ratchets upon their inner face and integral therewith, depending ears secured to the transverse member adjacent the axle, a rod lying parallel with said transverse members and journaled in said depending ears, dogs secured to the ends of said rod and an operating arm pivotally connected intermediate the ends of said rod adapted to be actuated for engaging and disengaging said dogs with the aforesaid ratchets.

2. In a hand-truck in combination with the body having spaced transverse members and the axle, the wheels secured to said axle having ratchets integral therewith, ears depending from one of said transverse members, a rocking element having its ends journaled therein, dogs secured to said rocking element, a lug intermediate the ends of said rocking element and an operating rod pivotally connected thereto at one end and supported from a transverse member at the opposite end which, when actuated will impart a rocking movement to the pawl carrying rocking element.

In testimony whereof I affix my signature in presence of two witnesses.

ANDREW ANDERSON.

Witnesses:
  R. J. SKANKE,
  FREDK. J. LARSON.